United States Patent
Sugiura (10) Patent No.: US 7,626,492 B2
(45) Date of Patent: Dec. 1, 2009

(54) ULTRAVIOLET LIGHT DETECTION DEVICE

(75) Inventor: Makiko Sugiura, Hekinan (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 11/826,061

(22) Filed: Jul. 12, 2007

(65) Prior Publication Data

US 2008/0068143 A1    Mar. 20, 2008

(30) Foreign Application Priority Data

Sep. 12, 2006   (JP) .............................. 2006-247053

(51) Int. Cl.
*B60Q 1/00* (2006.01)
(52) U.S. Cl. .................. 340/438; 340/457; 340/522; 340/600; 340/584; 250/203.4; 250/239; 62/132; 600/300
(58) Field of Classification Search ................. 340/438, 340/457, 522, 600, 584; 250/203.4, 239; 62/132; 600/300
See application file for complete search history.

(56) References Cited

U.S. PATENT DOCUMENTS 6,872,901 B2    3/2005   Su et al.
6,922,622 B2 *  7/2005   Dulin et al. .................. 701/45
2003/0222775 A1 * 12/2003  Rackham et al. ............ 340/457
2005/0115673 A1 *  6/2005  Samukawa et al. ...... 156/345.28

FOREIGN PATENT DOCUMENTS

JP    A-08-207569    8/1996
JP    A-2001-336977  12/2001

OTHER PUBLICATIONS

U.S. Appl. No. 11/724,167, filed Mar. 15, 2007, Sugiura et al.

* cited by examiner

*Primary Examiner*—Benjamin C Lee
*Assistant Examiner*—Ojiako Nwugo
(74) *Attorney, Agent, or Firm*—Posz Law Group, PLC

(57) ABSTRACT

A detector made of lanthanum-doped lead zirconate titanate detects intensity of ultraviolet light radiated inside of a vehicle. The detector sends ultrasonic wave to an incidence direction of ultraviolet light, and detects ultrasonic wave reflected by an object. An electrical unit determines the object to be an occupant of the vehicle or not based on the reflected ultrasonic wave. The electrical unit outputs a signal representing that a predetermined or more amount of ultraviolet light is radiated to the occupant, when the detector detects the predetermined or more amount of ultraviolet light and when the electrical unit determines the object to be the occupant.

11 Claims, 7 Drawing Sheets

ULTRAVIOLET LIGHT DETECTION DEVICE

CROSS REFERENCE TO RELATED APPLICATION

This application is based on Japanese Patent Application No. 2006-247053 filed on Sep. 12, 2006, the disclosure of which is incorporated herein by reference in its entirety.

BACKGROUND OF THE INVENTION

1. Field of the Invention

The present invention relates to an ultraviolet light detection device for detecting ultraviolet light radiated to an occupant of a vehicle.

2. Description of Related Art

A large amount of ultraviolet light radiated from the sun may affect human health, so that it is recommended that human should not be exposed to too much ultraviolet light. However, when human is in a vehicle traveling outside, the human has to be exposed to ultraviolet light, because ultraviolet light is radiated inside of the vehicle through a window glass.

In order to reduce the radiation of ultraviolet light into the vehicle, a colored glass capable of blocking or absorbing sunlight is used as the window glass. However, a deep-colored glass hinders vision of a driver of the vehicle at night or under bad weather, so that the deep-colored glass may affect safety driving by the driver.

Here, JP-A-8-207569 discloses a sunlight-adjusting device for a vehicle. An occupant, e.g., driver, of the vehicle operates the device, if necessary, to adjust a light-transmitting rate of a window glass of the vehicle by changing an applied voltage. Thereby, ultraviolet light radiated to the occupant can be reduced, and vision of the driver can be secured.

However, because ultraviolet light is not visible light, the occupant cannot accurately determine the radiated ultraviolet light to be strong or weak. That is, the occupant sensuously estimates intensity of the radiated ultraviolet light based on brightness of outside. Therefore, the occupant may inappropriately operate the device, although strong ultraviolet light is radiated to the occupant.

SUMMARY OF THE INVENTION

In view of the foregoing and other problems, it is an object of the present invention to provide an ultraviolet light detection device.

According to an example of the present invention, an ultraviolet light detection device detects ultraviolet light radiated to an occupant of a vehicle. A detecting element includes an ultraviolet detector made of lanthanum-doped lead zirconate titanate (PLZT), and detects intensity of ultraviolet light radiated inside of the vehicle. An electrical unit outputs an ultraviolet light detection signal representing that a predetermined or more amount of ultraviolet light is radiated to the occupant. The ultraviolet detector sends ultrasonic wave to an incidence direction of ultraviolet light, and detects ultrasonic wave reflected by an object to be detected. The electrical unit outputs the ultraviolet light detection signal when the detecting element detects the predetermined or more amount of ultraviolet light and when the object is determined to be the occupant of the vehicle based on the reflected ultrasonic wave.

Accordingly, intensity of the ultraviolet light radiated to the occupant of the vehicle can be detected. For example, when the predetermined or more amount of ultraviolet light is radiated, the ultraviolet light detection device may activate a device for blocking ultraviolet light.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1A:
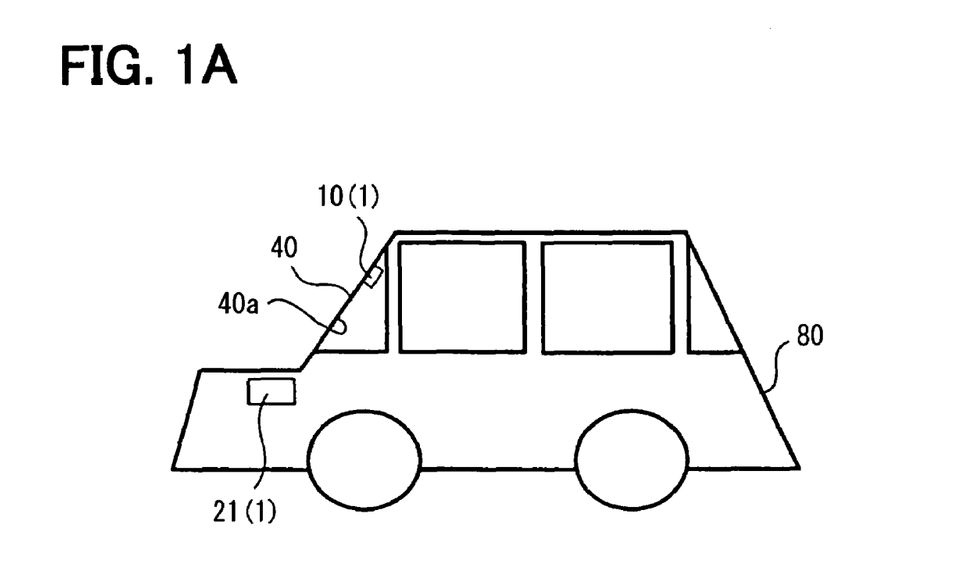
FIG. 1A is a schematic side view of a vehicle showing a position of an ultraviolet light detection device according to a first embodiment of the present invention.
Figure 1B:
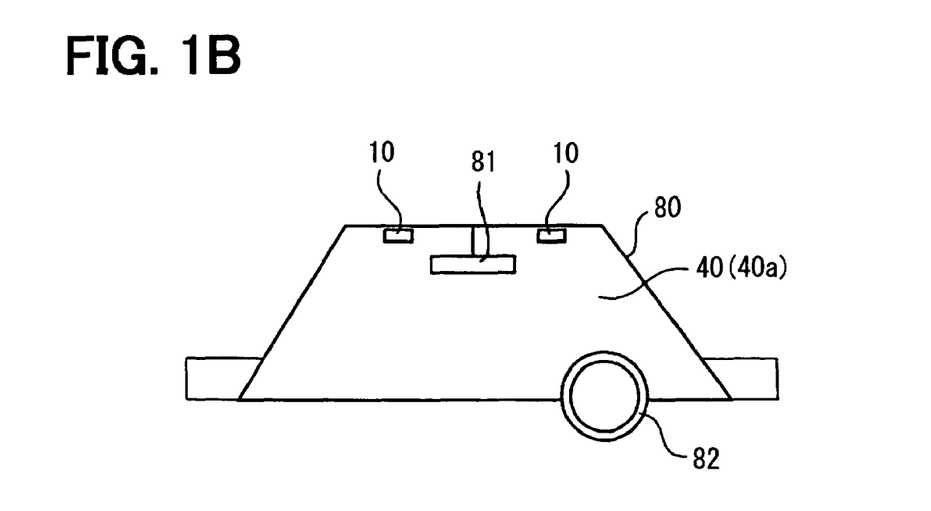
FIG. 1B is a schematic view from a driver seat of the vehicle showing the position of the ultraviolet light detection device.

As shown in FIGS. 1A and 1B, an ultraviolet light detection device 1 is mounted to a vehicle 80, and includes a detecting element 10 and an electronic control unit 21 (ECU). The detecting element 10 detects ultraviolet light, and sends and receives ultrasonic wave. The ECU 21 determines that an occupant exists in the vehicle 80 or not based on a signal output from the detecting element 10. Further, the ECU 21 outputs a radiation signal, when ultraviolet light having intensity equal to or larger than a threshold value is determined to be radiated and when the occupant is determined to exist in the vehicle 80. The radiation signal represents that the ultraviolet light having intensity equal to or larger than the threshold value is radiated to the occupant in the vehicle 80.

The detecting element 10 is arranged on an inner face 40a of a front windshield 40 of the vehicle 80. A rearview mirror 81 and a steering wheel 82 are shown to indicate the position of the detecting element 10. The detecting element 10 is located at a position to be able to detect each of an occupant on a driver seat and an occupant on a passenger seat in the vehicle 80. In this embodiment, the detecting element 10 is arranged at each top position in front of the driver seat and the passenger seat.

The ECU 21 is arranged in an engine compartment of the vehicle 80, and is constructed with a central processing unit (CPU), a random access memory (RAM), a read only memory (ROM), an input-output interface (I/O), and an application specified integrate circuit (ASIC) type microcomputer having a communication interface (which are not shown). The CPU is connected to the detecting element 10 through the I/O or communication interface.

Figure 2:
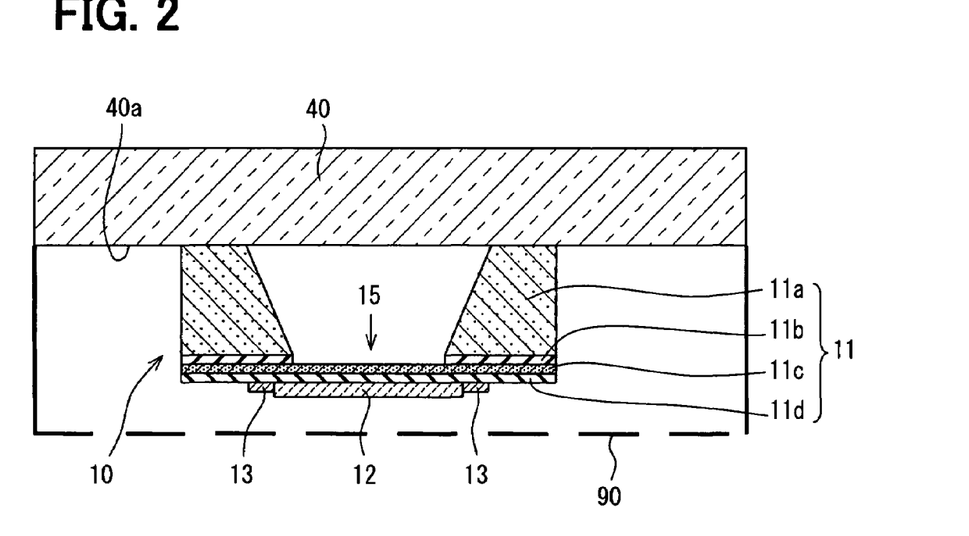
FIG. 2 is a schematic cross-sectional view showing a detecting element of the ultraviolet light detection device.

As shown in FIG. 2, the detecting element 10 is constructed by a rectangular semiconductor board 11 having a silicon on insulator (SOI) structure. The semiconductor board 11 is made of a material capable of transmitting ultraviolet light. A first insulation film 11b, a silicon active layer 11c and a second insulation film 11d are layered in this order on a support member 11a made of silicon, to construct the semiconductor board 11. An approximately center part of the support member 11a and the first insulation film 11b is removed in a rectangular shape using a micro electro mechanical system (MEMS) technology. Thereby, the support member 11a is a flat plate having the center part eliminated in the rectangular shape, and the first insulation film 11b is a thin film having the center part eliminated in the rectangular shape. Each of the silicon active layer 11c and the second insulation film 11d is a thin rectangular film, whose center part is not eliminated.

For example, in order to form the semiconductor board 11, the first insulation film 11b is formed on a silicon board, i.e., the support member 11a, then, a poly-silicon film is formed on the first insulation film 11b as the silicon active layer 11c. Thereafter, ion injection is performed to the poly-silicon film to activate, and the second insulation film 11d is formed on the silicon active layer 11c. Alternatively, an indium tin oxide (ITO) board or quartz board may be used as the semiconductor board 11. In this case, an amount of transmitting ultraviolet light can be increased compared with a case in which the semiconductor board 11 is used. Further, because the ITO board can also work as a bottom electrode, ultraviolet light can be detected from the both sides (top and bottom) of the ITO board.

A detector 12 is formed on the second insulation film 11d to cover the thinly formed part, i.e., silicon active layer 11c and second insulation film 11d. The detector 12 has a piezoelectric property and a photostrictive characteristic generated by ultraviolet light, which represents that the detector 12 is distorted when ultraviolet light is radiated to the detector 12. The detector 12 is constructed by a piezoelectric membrane made of lanthanum-doped lead zirconate titanate (PLZT). An electrode 13 is electrically connected to the detector 12.

Thereby, the thinly formed part and the detector 12 construct a membrane 15 having a predetermined resonance frequency. Ends of the membrane 15 are supported by the support member 11a.

The detector 12 sends ultrasonic wave to an object to be detected, and receives ultrasonic wave reflected by the object. The membrane 15 is displaced because the membrane 15 resonates with the received ultrasonic wave. The detector 12 transforms the displacement of the membrane 15 generated by the resonance into a voltage signal, so that the received ultrasonic wave can be detected. That is, the detector 12 can detect ultrasonic wave.

Further, because the detector 12 has the photostrictive characteristic, the detector 12 can detect intensity of ultraviolet light radiated to the detector 12. That is, the detector 12 can further detect ultraviolet light, in addition to ultrasonic wave.

The detecting element 10 is fitted to the inner face 40a of the front windshield 40 through the support member 11a such that the detector 12 faces, i.e., opposes to, the occupant of the vehicle 80.

A cover 90 is disposed at the occupant side of the detecting element 10. The cover 90 has a mesh part, i.e., hole, capable of transmitting ultrasonic wave. The cover 90 protects the detecting element 10 from a load of an outer force. However, the cover 90 may be eliminated when the detecting element 10 is located at a position such that the occupant has little chance to touch the detecting element 10.

Further, the detecting element 10 may be disposed in a box case capable of transmitting ultraviolet light, and the box case may be fitted to the front windshield 40.

Figure 3A:
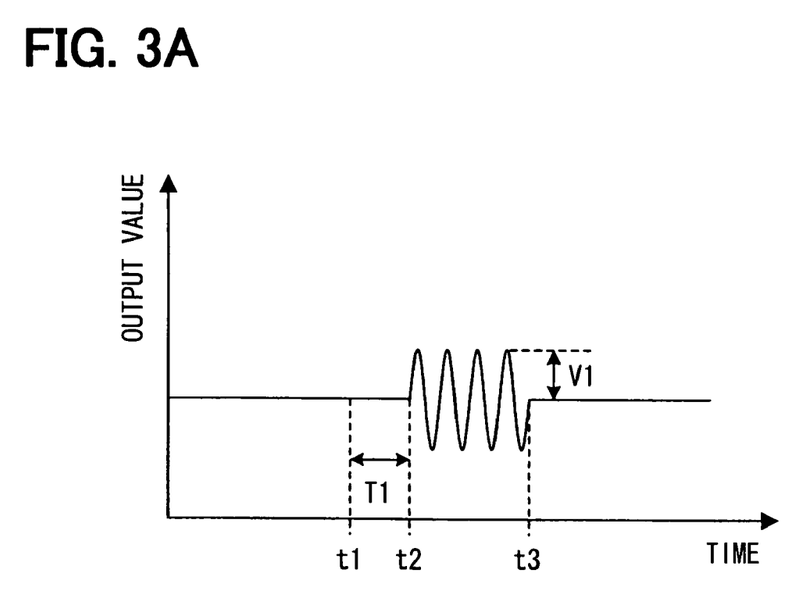
FIG. 3A is a graph showing a relationship between a time and an output value of ultrasonic wave output from the detecting element.

As shown in FIG. 3A, ultrasonic wave starts to be sent from the detector 12 to the occupant at time t1, and ultrasonic wave reflected by the occupant reaches the membrane 15 of the detecting element 10 and vibrates the membrane 15 from time t2 to time t3. Due to the vibration of the membrane 15, a voltage signal output from the detector 12 into the ECU 21 varies with wave shape from time t2 to time t3, so that the reflected ultrasonic wave can be detected. Here, a distance to an object, e.g., occupant, to be detected can be calculated based on a time period T1 (i.e., t2–t1). The ECU 21 can determine the object to be the occupant or not based on the calculated distance and a variation V1 of an output value of the voltage signal.

The above-described determination is performed by using single result of the calculated distance. However, the determination may be performed by using plural results of the calculated distance. When the occupant is not on a seat of the vehicle 80, the seat is detected as the object to be measured. Because the seat is fixed to the vehicle 80, the plural results of the calculated distance are approximately uniform. In contrast, when the occupant is detected as the object to be measured, the plural results of the calculated distance vary, because the occupant usually makes some movements. Thus, the ECU 21 can determine the object to be the occupant.

Figure 3B:
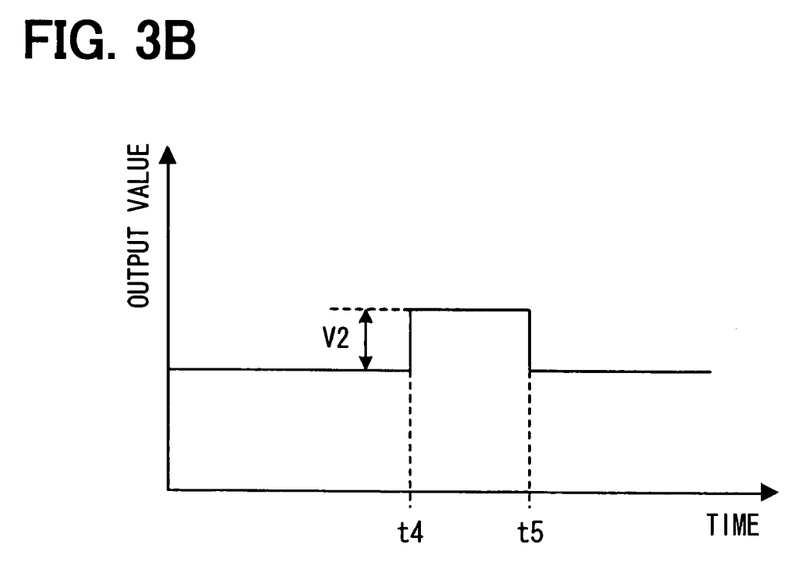
FIG. 3B is a graph showing a relationship between a time and an output value of ultraviolet light output from the detecting element.

Ultraviolet light is radiated from outside into the vehicle 80 through the front windshield 40, and reaches the detector 12 through the membrane 15. Because the lanthanum-doped lead zirconate titanate (PLZT) constructing the detector 12 has the photostrictive characteristic, the detector 12 is distorted when ultraviolet light is radiated to the detector 12. Then, an electrical signal corresponding to the distortion of the detector 12 is output. That is, as shown in FIG. 3B, an output value of the electrical signal increases by a variation V2 corresponding to an intensity of ultraviolet light from time t4 to time t5, in which ultraviolet light is radiated to the detector 12.

The detector 12 has two normal line directions, and a direction for sending and receiving ultrasonic wave to detect the occupant by the detector 12 is a direction heading the occupant. In contrast, a direction for detecting ultraviolet light by the detector 12 is a direction heading outside of the vehicle 80. The direction for detecting the occupant is opposite to the direction for detecting ultraviolet light. Therefore, the detector 12 detects ultrasonic wave and ultraviolet light on approximately the same line (normal line of the detector 12). Thus, the detector 12 can detect an amount of ultraviolet light radiated to the occupant detected by the ultrasonic wave.

Next, a flow of the ultraviolet light detection treatment performed by the microcomputer of the ECU 21 of the ultraviolet light detection device 1 will be described with reference to FIGS. 4 and 5. In the ultraviolet light detection treatment, the CPU of the microcomputer repeatedly performs an ultraviolet light detection program stored in the ROM of the microcomputer every predetermined period, e.g., one second or one minute, using a timer interrupt function, for example.

Figure 4:
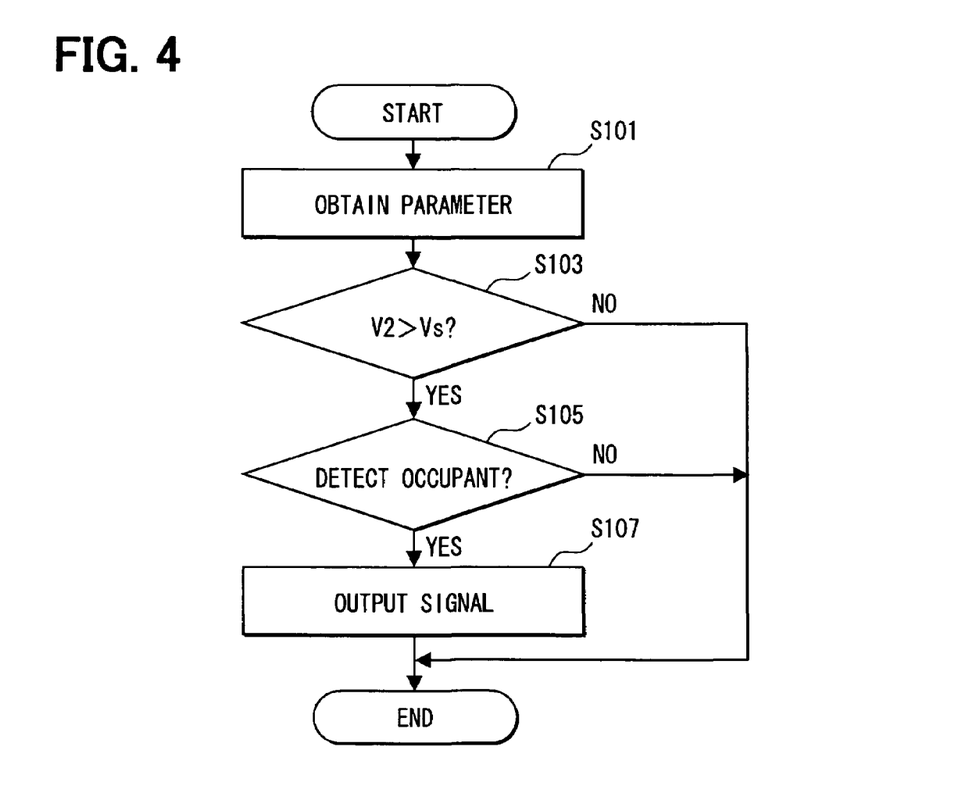
FIG. 4 is a flow chart showing an ultraviolet light detection treatment performed by an electronic control unit of the ultraviolet light detection device.
Figure 5:
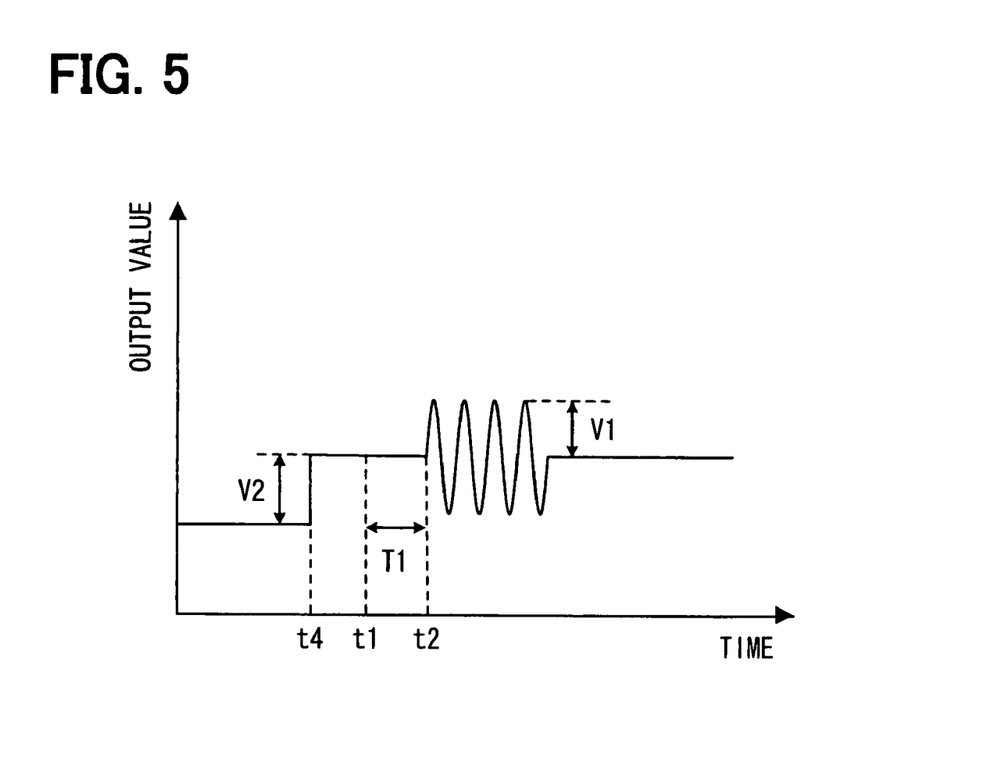
FIG. 5 is a graph showing a relationship between a time and an output value of a detection signal output from the detecting element.

As shown in FIG. 4, at step S101, the ECU 21 obtains parameters, e.g., V1, V2, T1, based on the detection signals output from the detecting element 10, after a predetermined initializing process. Specifically, the ECU 21 obtains a parameter of the output value V2 corresponding to the intensity of ultraviolet light, a parameter of the output value T1 used for calculating the distance to the object to be detected, and a parameter of the output value V1 corresponding to the intensity of ultrasonic wave reflected by the object based on the detection signals shown in FIG. 5.

At step S103, the ECU 21 determines the output value V2 corresponding to the intensity of ultraviolet light to be larger than a threshold Vs corresponding to an allowed intensity of ultraviolet light (V2>Vs) or not.

When the ECU 21 determines the output value V2 to be larger than the threshold Vs (Yes at S103), ultraviolet light having intensity larger than the allowed intensity determines to be radiated into the vehicle 80. Then, the ECU 21 proceeds to step S105. In contrast, when the ECU 21 determines the output value V2 to be equal to or smaller than the threshold Vs (No at S103), the ECU 21 does not output the ultraviolet light detection signal because the intensity of ultraviolet light is low. Then, the ultraviolet light detection treatment is finished.

At step S105, the ECU 21 determines the occupant to exist at the radiation direction of ultraviolet light or not, based on the output value T1 used for calculating the distance to the object and the output value V1 corresponding to the intensity of ultrasonic wave reflected by the object, which are obtained at step S101.

When the ECU 21 determines the occupant to exist (Yes at S105), the ECU 21 proceeds to step S107. In contrast, when the ECU 21 determines the occupant not to exist (No at S105), the ECU 21 does not output the ultraviolet light detection signal, and the ultraviolet light detection treatment is finished.

At step S107, the ECU 21 outputs the ultraviolet light detection signal. When the ECU 21 determines the occupant to exist at the radiation direction of ultraviolet light at S105, the ECU 21 outputs the ultraviolet light detection signal. Thereby, a treatment for blocking the ultraviolet light radiated to the occupant may be performed. For example, the ultraviolet light detection signal is output into an alarm unit (not shown). The alarm unit indicates the detection of ultraviolet light to the occupant with sound information or alarm buzzer to promote the occupant to close window, wear a jacket or wear sunglasses.

When the ultraviolet light detection signal is output into a controller (not shown) for controlling window glass, the controller activates a UV cutting function of the window glass. For example, the window glass contains a material capable of reflecting ultraviolet light, e.g., $TiO_2$. When the ultraviolet light detection signal is output, electrophoretic migration is performed to orient the $TiO_2$, so that ultraviolet light can be blocked. Alternatively, an electric-colored glass may be used for the window glass. The electric-colored glass is colored by applying a voltage. Further, a UV filter may be inserted into the window glass in order to block ultraviolet light.

After ultraviolet light detection signal is output at step S107, the ultraviolet light detection treatment is finished. In the above-described treatment, step S103 is performed earlier than step S105. However, step S105 may be performed earlier than step S103.

Figure 6:
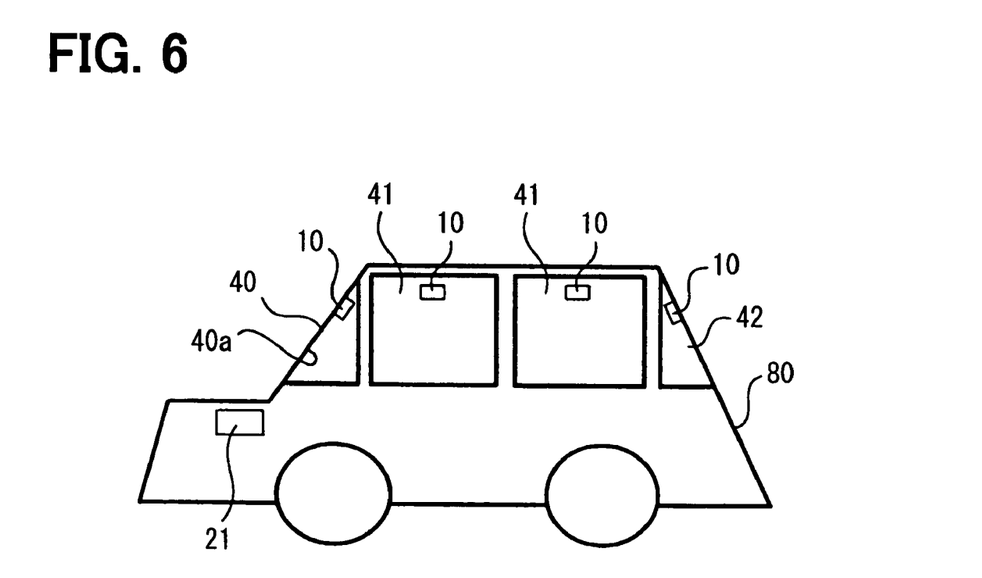
FIG. 6 is a schematic side view of the vehicle showing another position of the ultraviolet light detection device.

As shown in FIG. 6, the detecting element 10 may be arranged on each side windshield or rear windshield. In this case, because ultraviolet light radiated to an occupant on a rear seat can be detected, the occupant on the rear seat can be restricted from being exposed to ultraviolet light having strong intensity. Further, the occupant on the front seat can be protected from ultraviolet light radiated through the side windshield in addition to ultraviolet light radiated through the front windshield.

According to the first embodiment, the ultraviolet light detection device 1 includes the detecting element 10 having the detector 12 made of the lanthanum-doped lead zirconate titanate (PLZT) with the photostrictive (light-distorting) characteristic and the piezoelectric property. Therefore, the detecting element 10 can detect intensity of ultraviolet light radiated into the vehicle 80. The detecting element 10 further sends ultrasonic wave toward the radiation direction of ultraviolet light, and detects ultrasonic wave reflected by the object to be detected. The ECU 21 outputs the ultraviolet light detection signal, when the detecting element 10 detects ultraviolet light having intensity larger than the predetermined amount and when the ECU 21 determines the object to be the occupant of the vehicle 80 based on the detection result of ultrasonic wave reflected by the object. The ultraviolet light detection signal represents that the predetermined or more amount of ultraviolet light is radiated to the occupant.

Because the detector 12 of the detecting element 10 detects both of the ultrasonic wave and the ultraviolet light on approximately the same line, the detector 12 can detect the intensity of ultraviolet light radiated to the occupant detected by the ultrasonic wave from outside of the vehicle 80. When the predetermined or more amount of ultraviolet light is radiated to the occupant, the ECU 21 outputs the ultraviolet light detection signal, so that the treatment for blocking the ultraviolet light can be activated.

Thus, the ultraviolet light detection device 1 can activate the treatment for blocking the ultraviolet light, in a case where the predetermined or more amount of ultraviolet light is radiated to the occupant when the device 1 detects the intensity of ultraviolet light radiated to the occupant of the vehicle 80.

Further, because the single detector 12 can detect both of the ultrasonic wave and the ultraviolet light, the number of detecting elements 10 can be reduced, so that a size of the device 1 can be made smaller.

The semiconductor board 11 has the membrane 15, and a part of the membrane 15 is thin, on which the detector 12 is disposed. Therefore, the displacement of the detector 12 due to the vibration by ultrasonic wave can be increased, so that sensitivity for detecting ultrasonic wave can be improved.

Because the detecting element 10 is located on the front windshield 40, the rear windshield 42 or the side windshield 41, ultraviolet light radiated to the occupant through each of the windshields 40, 41, 42 can secure to be detected.

Second Embodiment

Figure 7A:
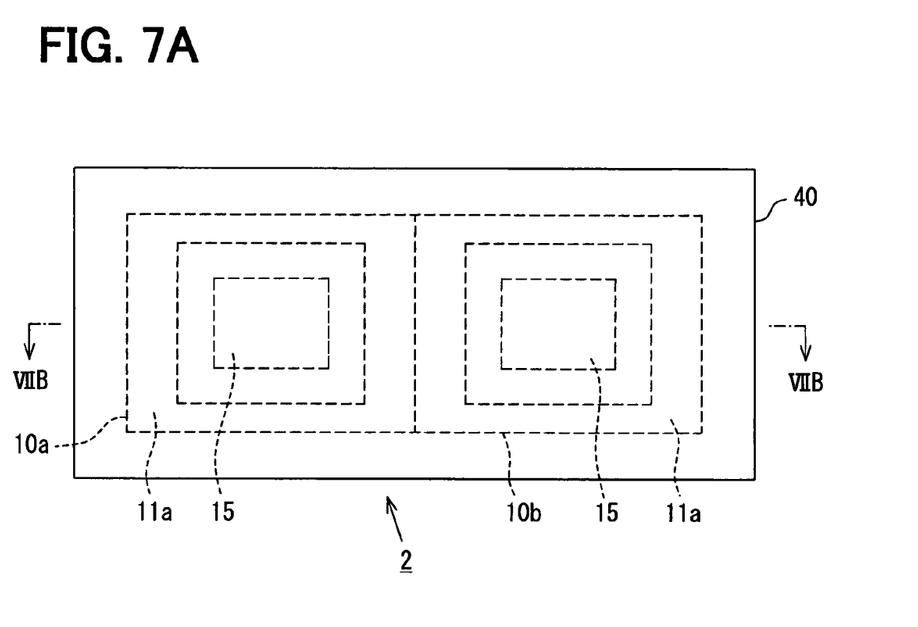
FIG. 7A is a schematic plan view showing a detecting element of an ultraviolet light detection device according to a second embodiment of the present invention.
Figure 7B:
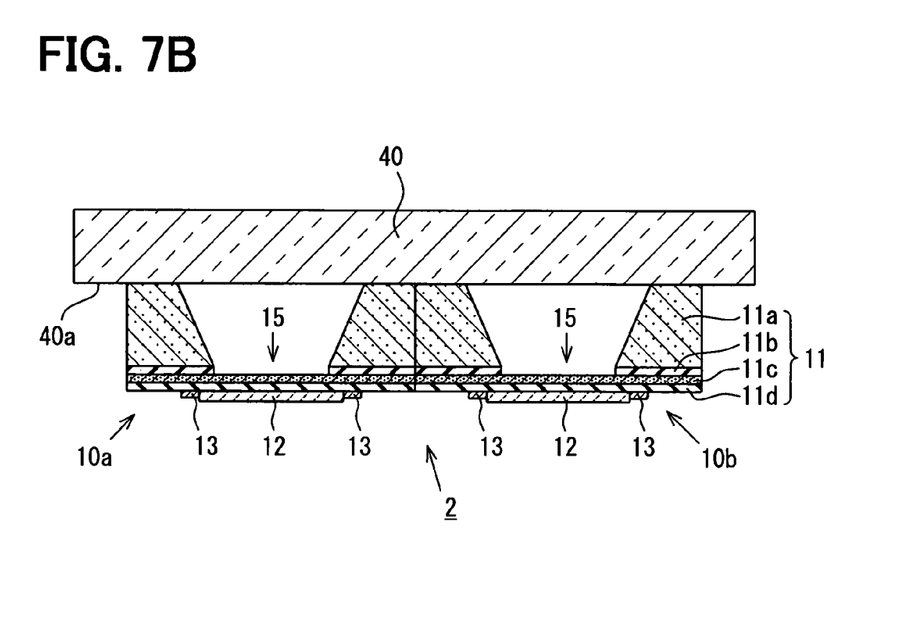
FIG. 7B is a schematic cross-sectional view showing the detecting element taken along line VIIB-VIIB in FIG. 7A.

As shown in FIGS. 7A and 7B, multiple, e.g., two, detecting elements 10a, 10b are arranged in an array arrangement in an ultraviolet light detection device 2 in a second embodiment. Other parts in the second embodiment may be made similar to the first embodiment.

The two detecting elements 10a, 10b are fitted to the front windshield 40 such that the detectors 12 of the two detecting elements 10a, 10b are arranged on the same semiconductor board 11 parallel to each other. In this case, not only the distance to the object to be detected but also a position of the object can be measured based on a time difference and a phase difference between ultrasonic waves received by the detecting elements 10a, 10b. Therefore, the movement of the object can be accurately detected, so that the object can be determined to be the occupant or not more accurately.

Here, when an interval between center points of the membranes 15 of the adjacent detecting elements 10a, 10b is approximately equal to an integral multiple of half wavelength of the ultrasonic wave, the time difference can be also detected based on the phase difference. Thus, the time difference can be more accurately detected.

The number of the detecting elements 10 is not limited to two. For example, four, e.g., two-by-two, detecting elements 10 may be used as one unit. In this case, the position of the object in an up-and-down direction can be also measured, so that the occupant can be determined to exist or not more accurately.

In the second embodiment, the integrated detecting elements 10a, 10b are arranged in the ultraviolet light detection device 2. Alternatively, individually-produced multiple detecting elements 10 may be arranged in the device 2.

A part of the multiple detecting elements 10 may be replaced by another detecting element capable of detecting infrared ray. For example, when the detector 12 of the detecting element 10a is made of lead zirconate titanate (PZT), the detector 12 can detect intensity of heat ray radiated from the object to be detected. Therefore, the detector 12 can detect both of the ultrasonic wave and the infrared ray. Alternatively, the single detecting element 10 further includes an infrared detector capable of detecting infrared ray, in addition to the detector 12 for detecting ultraviolet light. The infrared detector may be disposed opposite to the detector 12. For example, the infrared detector is disposed on the semiconductor board 11 at the occupant side, and the detector 12 is disposed on the semiconductor 11 adjacent to the front windshield 40. In this case, a size of the device 2 can be reduced.

Thereby, the temperature of the object can be measured. At step S105 of FIG. 4, the ECU 21 detects the existence of the object, i.e., occupant. At this time, the temperature of the object can be determined to be in a predetermined range, e.g., between 32° C. and 43° C., or not. When the temperature of the object is in the predetermined range, the object can be determined to be the occupant.

When a surface temperature of a body of the occupant is detected, the occupant can be determined to be in a comfortable state or not. For example, when the surface temperature of the body of the occupant is equal to or larger than a predetermined value, an air-conditioner may be activated to cool.

According to the second embodiment, the multiple detecting elements 10a, 10b are arranged in the array arrangement such that the detectors 12 of the multiple detecting elements 10a, 10b face to approximately the same direction. Therefore, not only the distance to the object to be detected but also the position of the object can be measured based on the time difference and the phase difference between ultrasonic waves received by the detecting elements 10a, 10b. Thereby, the movement of the object can be accurately detected, so that the object can be determined to be the occupant or not more accurately.

Because the detectors 12 of the detecting elements 10a, 10b are disposed on the same semiconductor board 11, the detecting elements 10a, 10b can be produced in a single process at the same time. Further, cost for manufacturing the device 2 can be reduced, because the multiple detecting elements 10a, 10b can be fitted at the same time.

A part of the multiple detecting elements 10 may be replaced by an infrared-ray detecting element capable of detecting infrared ray. For example, the detector 12 of the detecting element 10a is made of the lead zirconate titanate (PZT) having a pyroelectric property. In this case, the single detector 12 of the detecting element 10a can detect a heat quantity of the occupant in addition to the reflected ultrasonic wave. Thus, the object can be determined to be the occupant or not with the single detector 12 of the detecting element 10a, so that the object can be determined to be the occupant or not more accurately.

Other Embodiments

Figure 8:
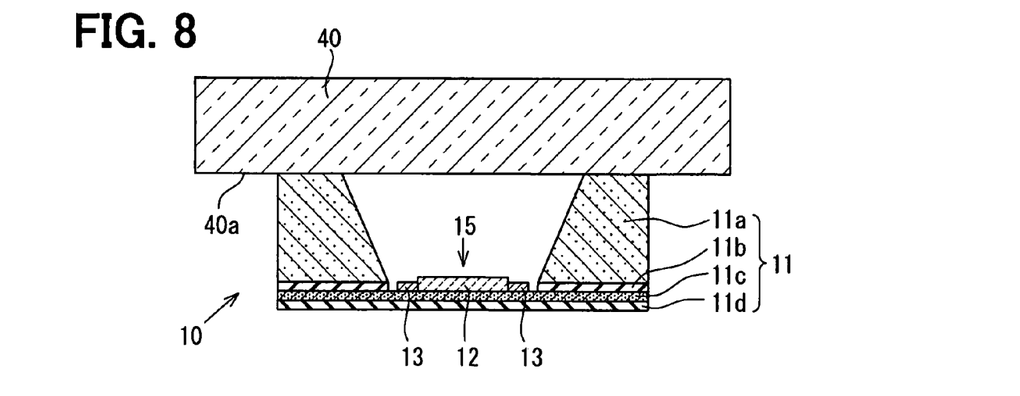
FIG. 8 is a schematic cross-sectional view showing a detecting element of an ultraviolet light detection device according to other embodiments.

As shown in FIG. 8, the detector 12 may be arranged on the silicon active layer 11c adjacent to the support member 11a. In this case, ultraviolet light reaches the detector 12 without passing through the semiconductor board 11, so that an opaque board relative to ultraviolet light can be used as the semiconductor board 11. Further, sensitivity for detecting ultraviolet light can be improved, because attenuation of ultraviolet light can be reduced.

A semiconductor board having a flat plate shape, that is, a semiconductor board not having the membrane 15 may be used as the semiconductor board 11 in the detecting element 10. In this case, the manufacturing cost of the detecting element 10 can be reduced, because the membrane 15 is not formed on the detecting element 10.

Further, the membrane 15 may be cantilevered (i.e., one-side supported) by the support member 11a in the detecting element 10. In this case, the membrane 15 can be easily displaced (deformed) compared with a case in which the membrane 15 is supported through the both ends. Therefore, the displacement (deformation) of the membrane 15 can be increased when ultrasonic wave vibration is transmitted thereto, so that sensitivity for detecting ultrasonic wave can be improved.

The detector 12 formed on the membrane 15 detects ultrasonic wave and ultraviolet light in the above embodiments. However, any detecting unit may be used as the detector 12 without departing from the scope of the present disclosure. For example, a capacitive vibration detector 60 shown in FIG. 9A may be used in place of the detector 12, in which a piezoelectric film for detecting ultraviolet light is formed on a vibration face thereof. The capacitive vibration detector 60 further detects ultrasonic wave based on a capacitance variation between first and second electrodes 16, 17. Because the capacitive vibration detector 60 has a relatively broad resonance frequency band, an allowed production variation is relatively large. Thus, production yield can be increased.

Figure 9A:
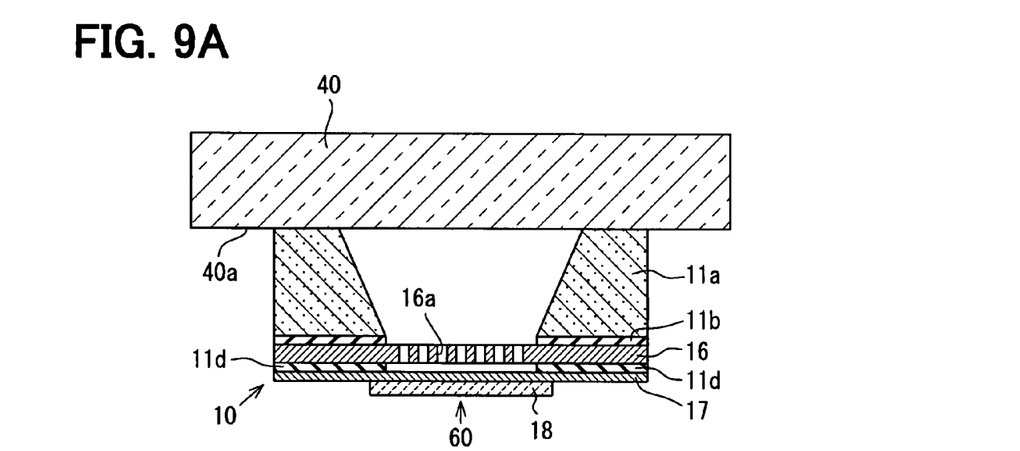
FIG. 9A is a schematic cross-sectional view showing a detecting element of an ultraviolet light detection device according to other embodiments.

As shown in FIG. 9A, the capacitive vibration detector 60 includes the first electrode 16 formed on the first insulation film 11b, and the second electrode 17 opposing to the first electrode 16 through a predetermined gap. The second electrode 17 is made of a material capable of transmitting ultraviolet light. A piezoelectric film 18 is formed on the second electrode 17, and detects ultraviolet light and outputs an electrical signal. Here, the piezoelectric film 18 is made of lanthanum-doped lead zirconate titanate (PLZT).

A through hole 16a is provided in the first electrode 16 in order to reduce affect of air damping by the vibration. A route for transmitting the ultrasonic wave by the capacitive vibration detector 60 is approximately similar to that by the detector 12. When the capacitive vibration detector 60 receives ultrasonic wave and vibrates, the gap between the first and second electrodes 16, 17 is varied. Thereby, a capacitance of a capacitor constructed with the first and second electrodes 16, 17 is varied, so that the ultrasonic wave can be detected.

Ultraviolet light passes through the through hole 16a of the first electrode 16 and the second electrode 17, then, reaches the piezoelectric film 18.

Figure 9B:
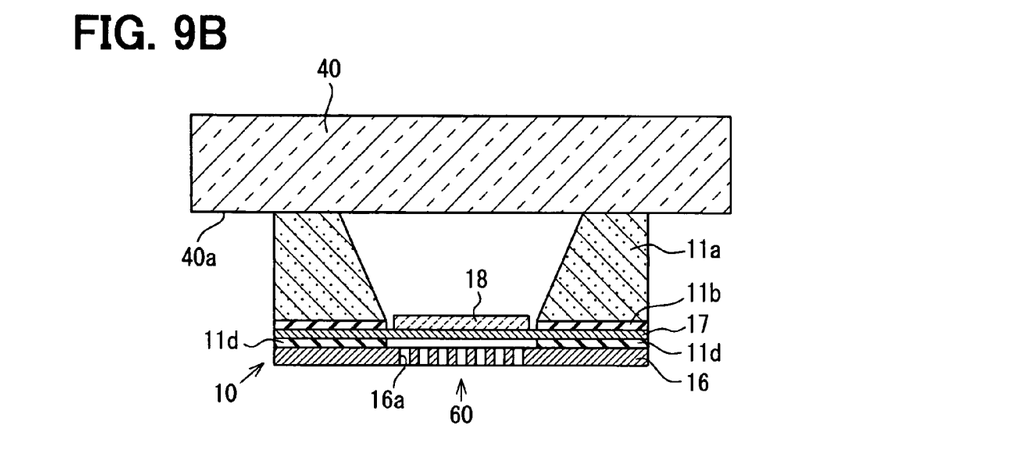
FIG. 9B is a schematic cross-sectional view showing a detecting element of an ultraviolet light detection device according to other embodiments.

As shown in FIG. 9B, the first and second electrodes 16, 17 may be interchanged with each other, and the piezoelectric film 18 may be formed on the second electrode 17 adjacent to the support member 11a. In this case, ultraviolet light is radiated to the piezoelectric film 18 without passing through the second electrode 17, so that attenuation of the ultraviolet light can be reduced.

Figure 10:
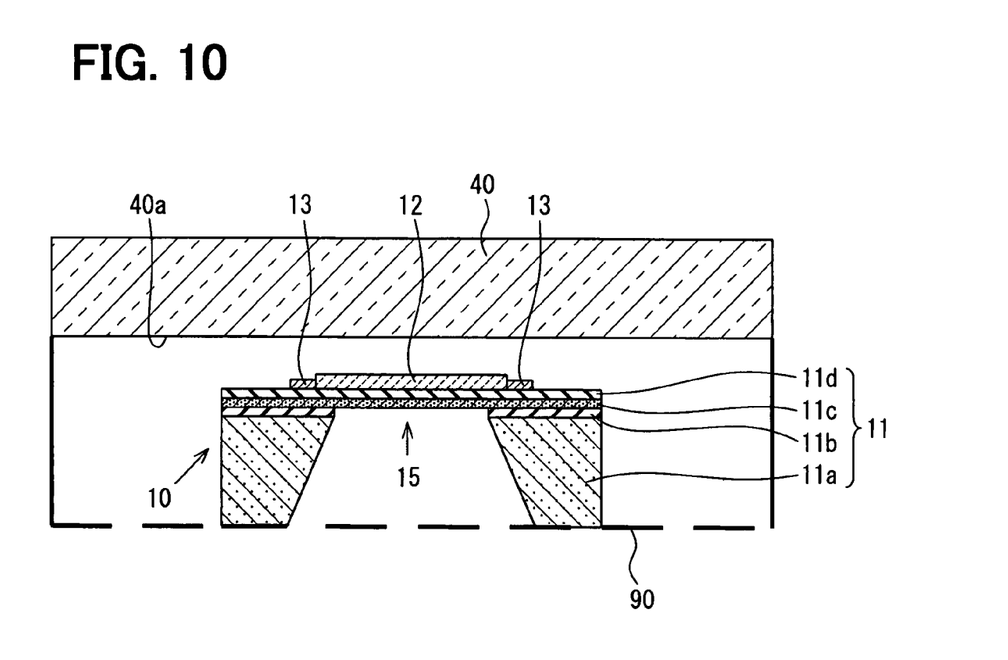
FIG. 10 is a schematic cross-sectional view showing another fitting structure of the detecting element.

As shown in FIG. 10, the detecting element 10 may be fitted to the cover 90 through the support member 11a such that the detector 12 opposes to the inner face 40a of the front windshield 40. In this case, the detecting element 10 can be protected from a load of an outer force. Further, attenuation of ultraviolet light can be reduced because the ultraviolet light can reach the detector 12 without passing through the semiconductor board 11. Thus, sensitivity for detecting ultraviolet light can be improved.

The detector 12 may be directly formed on the inner face 40a of the front windshield 40. In this case, manufacturing cost can be reduced because the semiconductor board 11 can be eliminated. Further, attenuation of ultraviolet light can be reduced, because ultraviolet light reaches the detector 12 without passing through the semiconductor board 11. Thus, sensitivity for detecting ultraviolet light can be improved.

Such changes and modifications are to be understood as being within the scope of the present invention as defined by the appended claims.

What is claimed is:

1. An ultraviolet light detection device for detecting ultraviolet light radiated to an occupant of a vehicle, the device comprising:
   a detecting element including an ultraviolet detector for detecting intensity of ultraviolet light radiated inside of the vehicle, wherein the ultraviolet detector is made of lanthanum-doped lead zirconate titanate (PLZT); and
   an electrical unit for outputting an ultraviolet light detection signal representing that a predetermined or more amount of ultraviolet light is radiated to the occupant, wherein
   the ultraviolet detector sends ultrasonic wave to an incidence direction of ultraviolet light, and detects ultrasonic wave reflected by an object to be detected, and
   the electrical unit outputs the ultraviolet light detection signal when the detecting element detects the predetermined or more amount of ultraviolet light and when the object is determined to be the occupant of the vehicle based on the reflected ultrasonic wave.

2. The device according to claim 1, wherein
the ultraviolet detector is disposed on a board, and
the board has a thin membrane part in at least a part of an area, on which the ultraviolet detector is disposed.

3. The device according to claim 1, wherein
the ultraviolet detector is a capacitive vibration detector having a piezoelectric film made of the lanthanum-doped lead zirconate titanate (PLZT) on a vibration face.

4. The device according to claim 1, wherein
the detecting element includes a plurality of the ultraviolet detectors, and
the plurality of the ultraviolet detectors are arranged approximately parallel to each other, and oppose to an approximately the same direction.

5. The device according to claim 4, wherein
the plurality of the ultraviolet detectors are disposed on the same board.

6. The device according to claim 1, further comprising:
another detecting element having an infrared detector for detecting infrared ray.

7. The device according to claim 6, wherein
the infrared detector is made of lead zirconate titanate (PZT),
the infrared detector detects intensity of heat ray radiated from the object, and
the infrared detector sends ultrasonic wave, and detects ultrasonic wave reflected by the object.

8. The device according to claim 1, wherein
the detecting element is disposed on at least one of a front windshield, a rear windshield and a side windshield.

9. The device according to claim 1, wherein
the detecting element includes a cover having a hole transmittable of ultrasonic wave, and
the cover is disposed between the ultraviolet detector and the object.

10. The device according to claim 2, wherein
the board is an indium tin oxide (ITO) board.

11. The device according to claim 1, wherein
the detecting element further includes an infrared detector for detecting infrared ray.

* * * * *